US011904760B2

(12) United States Patent
Ryoo

(10) Patent No.: US 11,904,760 B2
(45) Date of Patent: Feb. 20, 2024

(54) VEHICLE LAMP INCLUDING BEZEL HAVING A FIRST AND SECOND THROUGH HOLE

(71) Applicant: HYUNDAI MOBIS CO., LTD., Seoul (KR)

(72) Inventor: Dong Ho Ryoo, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/065,594

(22) Filed: Dec. 13, 2022

(65) Prior Publication Data

US 2023/0294595 A1    Sep. 21, 2023

(30) Foreign Application Priority Data

Mar. 21, 2022 (KR) .................. 10-2022-0034699
Mar. 21, 2022 (KR) .................. 10-2022-0034700

(51) Int. Cl.
| | |
|---|---|
| *B60Q 1/22* | (2006.01) |
| *F21S 43/37* | (2018.01) |
| *F21S 43/27* | (2018.01) |
| *F21S 45/49* | (2018.01) |
| *F21S 43/19* | (2018.01) |
| *F21S 43/31* | (2018.01) |
| *F21S 45/47* | (2018.01) |
| *B60R 1/26* | (2022.01) |
| *B60Q 1/24* | (2006.01) |
| *B60Q 1/00* | (2006.01) |
| *F21S 45/48* | (2018.01) |

(52) U.S. Cl.
CPC ............. *B60Q 1/22* (2013.01); *B60Q 1/0023* (2013.01); *B60Q 1/249* (2022.05); *B60R 1/26* (2022.01); *F21S 43/19* (2018.01); *F21S 43/27* (2018.01); *F21S 43/31* (2018.01); *F21S 43/37* (2018.01); *F21S 45/47* (2018.01); *F21S 45/49* (2018.01); *F21S 45/48* (2018.01)

(58) Field of Classification Search
CPC .... B60Q 1/22; B60R 1/26; F21S 43/19; F21S 43/27; F21S 43/37
See application file for complete search history.

(56) References Cited

U.S. PATENT DOCUMENTS

| | | | | |
|---|---|---|---|---|
| 2005/0093684 A1* | 5/2005 | Cunnien | ................... | B60Q 1/56 |
| | | | | 348/148 |
| 2009/0290370 A1* | 11/2009 | Koizumi | ............... | G01S 7/4811 |
| | | | | 362/497 |
| 2017/0210282 A1* | 7/2017 | Rodriguez Barros | . | B60Q 1/324 |

* cited by examiner

*Primary Examiner* — Keith G. Delahoussaye
(74) *Attorney, Agent, or Firm* — DLA Piper LLP (US)

(57) ABSTRACT

A vehicle lamp comprising a housing having a space opened in a forward direction, a bezel mounted on a front of the housing and having first and second through holes, a first optical module having a first light source device provided to irradiate light to a road surface through the first through hole, the first optical module is contained in the space, mounted in the housing, and installed to be inclined to allow an optical axis of the first light source device to be gradually inclined downward in the forward direction, and a second optical module including a second light source device provided to irradiate light forward through the second through hole, the second optical module being contained in the space and mounted on the bezel, an area in which the first optical module is positioned in the bezel is formed to gradually protrude upward in the forward direction.

12 Claims, 9 Drawing Sheets

VEHICLE LAMP INCLUDING BEZEL HAVING A FIRST AND SECOND THROUGH HOLE

CROSS-REFERENCE TO RELATED APPLICATION

This application claims the benefit of priority to Korean Patent Application Nos. 10-2022-0034699 and 10-2022-0034700, filed in the Korean Intellectual Property Office on Mar. 21, 2022, the entire contents of which are incorporated herein by reference.

TECHNICAL FIELD

The present disclosure relates to a vehicle lamp.

BACKGROUND

The reverse guide lamp provided in a vehicle is turned on when the driver operates the shift lever to the reverse (R) position to illuminate the rear and at the same time, form a pattern image of a specified shape on a road surface, thereby performing a function of transmitting the lane change or reverse intention of a preceding vehicle.

However, a conventional reverse guide lamp has poor visibility depending on a position where the conventional reverse guide lamp is installed at the rear of the vehicle, and thus the stability and appearance are deteriorated.

In addition, the conventional reverse guide lamp has a design limitation because the size of the lamp increases. Therefore, there is a need to provide the technology capable of miniaturizing a conventional reverse guide lamp while ensuring visibility.

SUMMARY

The present disclosure has been made to solve the above-mentioned problems occurring in the prior art while advantages achieved by the prior art are maintained intact.

An aspect of the present disclosure provides a vehicle lamp in which appearance commercial properties are increased and height is minimized.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a vehicle lamp includes a housing having a space that is opened in a forward direction in which light is irradiated, a bezel mounted on a front of the housing and having a first through hole and a second through hole, a first optical module having a first light source device provided to irradiate light to a road surface through the first through hole, wherein the first optical module is contained in the space, mounted in the housing, and installed to be inclined to allow an optical axis of the first light source device to be gradually inclined downward in the forward direction, and a second optical module including a second light source device provided to irradiate light forward through the second through hole, the second optical module being contained in the space and mounted on the bezel, wherein an area in which the first optical module is positioned in the bezel is formed to gradually protrude upward in the forward direction.

The vehicle lamp may further include an outer lens coupled to the front of the housing and provided to cover the bezel, the first optical module and the second optical module.

The second optical module may be installed in an area including a center of the bezel, the first optical module may be arranged on one side of the second optical module in a horizontal direction, and an area of the bezel in which the first optical module is located may protrude forward compared to other areas of the bezel.

The first optical module may include a heat dissipation device assembled on a rear surface of the first light source device to dissipate heat from the first light source device, a barrel device formed with a receiving space therein and assembled to a front surface of the first light source device, and an assembly member passing through the heat dissipation device, the first light source device and the barrel device to assemble the first light source device and the barrel device. When a surface extending in a vertical direction from a central axis of the barrel device is referred to as a vertical reference surface, the assembly member may be spaced apart from the vertical reference surface when the first optical module is mounted on the housing.

The heat dissipation device may include a heat dissipation assembly hole through which the assembly member passes. The barrel device may include a barrel assembly hole through which the assembly member passes. The heat dissipation assembly hole and the barrel assembly hole may be spaced apart from the vertical reference surface while the first optical module is mounted on the housing.

The heat dissipation device may include a heat sink coupled to the first light source device, and a plurality of coupling pieces protruding from the heat sink and provided to be coupled to the housing, wherein a top edge of the heat sink is parallel to the road surface.

The heat sink may have a quadrangular shape including an upper side, a lower side, and a pair of side sides when viewed in an optical axis direction of the first optical module, and the upper side forming the top edge may be parallel to the road surface.

The first optical module may further include a fixing member fastened through the heat dissipation device and the housing to mount the first optical module to the housing, wherein the fixing member may be fastened to the housing in a direction parallel to a traveling direction of a vehicle.

The heat dissipation device may include a heat sink coupled to the first light source device, and a plurality of coupling pieces protruding from the heat sink, coupled to the housing, and formed with a coupling hole through which the fixing member passes, wherein the housing may include a fixing groove into which the fixing member is inserted, and the coupling hole and the fixing groove may be parallel to the traveling direction of the vehicle.

The first optical module may further include a lens device provided in the receiving space formed in the barrel device and arranged in front of the first light source device, and a shield device arranged between the first light source device and the lens device and provided to form a specified beam pattern by shielding a portion of light irradiated from the first light source device.

The shield device may include a shielding area that shields the light irradiated from the first light source device, and a penetration area through which the light emitted from the first light source device passes and is formed in a specified pattern, wherein the shield device may be detachably assembled to the barrel device.

The second optical module may include a reflection device installed on the bezel, provided to reflect light emitted from the second light source device to irradiate the light forward, and including a multi-facet reflection (MFR) including a plurality of facets.

The second light source device may include a second substrate provided over the reflection device and a plurality of second light sources installed on the second substrate, wherein the reflection device may include a main body coupled to the second substrate and including a light source hole penetrating at positions corresponding to the plurality of second light sources, and a plurality of reflection surfaces provided integrally with the body, including the plurality of facets, and continuously formed to correspond to the plurality of second light sources.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, embodiments of the present disclosure will be described with reference to accompanying drawings.

First, the embodiments described below are embodiments suitable for understanding the technical characteristics of the present disclosure, that is, a vehicle lamp. However, the present disclosure is not limited to the embodiments described below, or the technical features of the present disclosure are not limited by the described embodiments, and various modifications are possible within the technical scope of the present disclosure.

Figure 1:
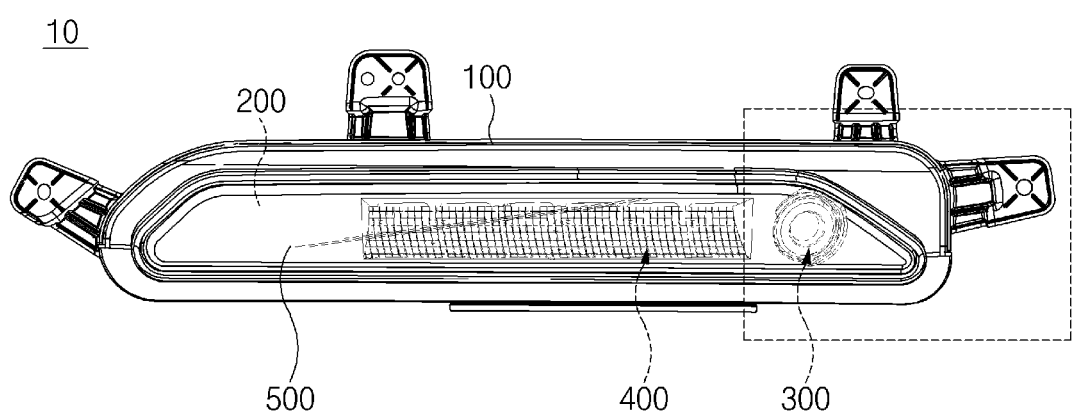
FIG. 1 is a front view illustrating a vehicle lamp according to an embodiment of the present disclosure.
Figure 2:
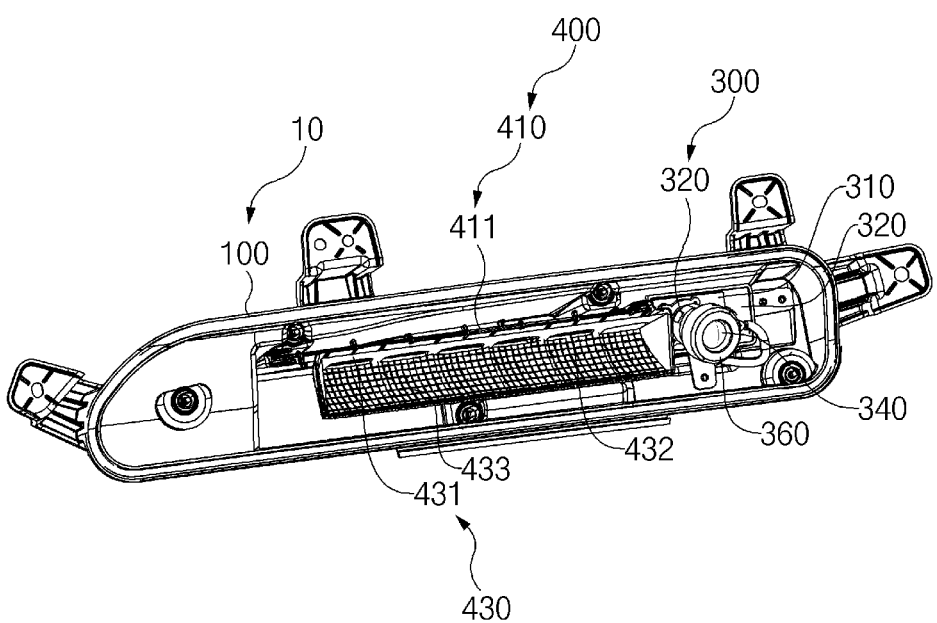
FIG. 2 is a view illustrating a vehicle lamp according to an embodiment of the present disclosure and illustrates a state in which an outer lens is removed from FIG. 1.
Figure 3:
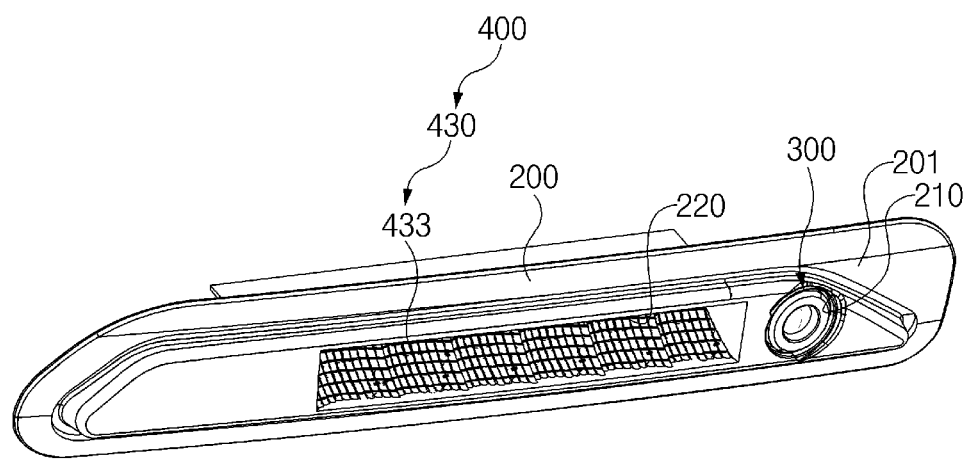
FIG. 3 is a perspective view illustrating a part of a vehicle lamp according to an embodiment of the present disclosure and illustrates a state in which a first optical module and a second optical module are mounted on a bezel.
Figure 4:
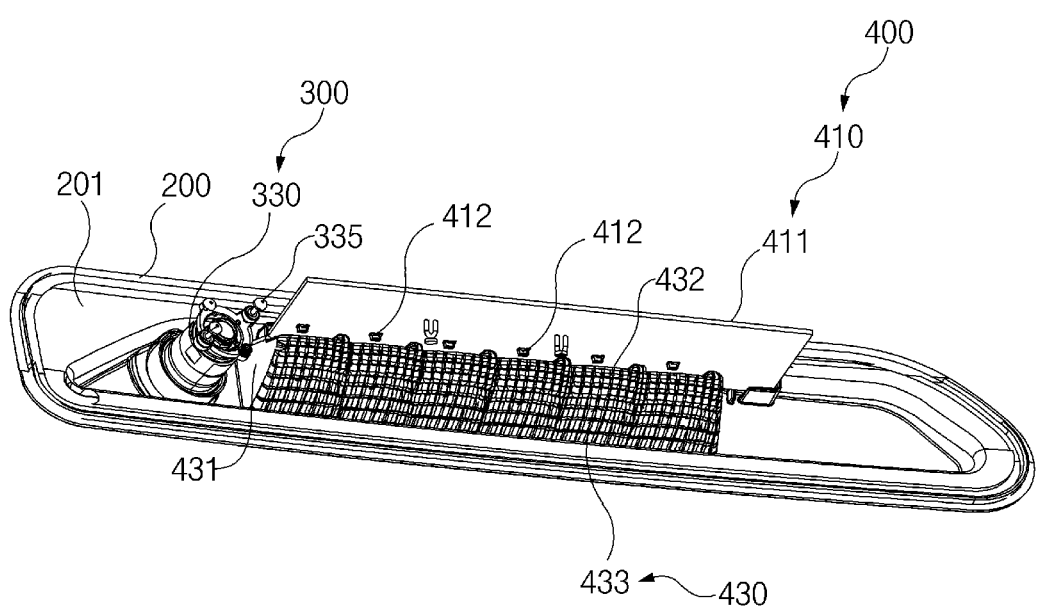
FIG. 4 is a perspective view of the vehicle lamp of FIG. 3 when viewed from the rear.
Figure 5:
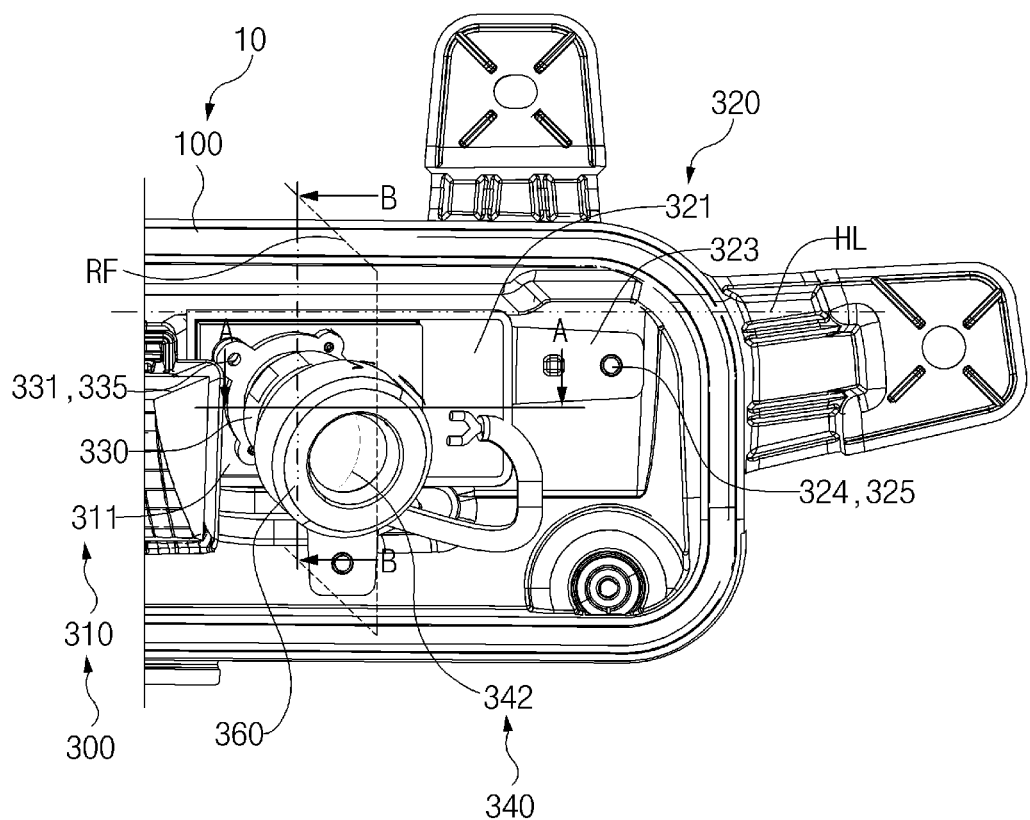
FIG. 5 is a perspective view illustrating a part of a vehicle lamp according to an embodiment of the present disclosure and illustrates a state in which a first optical module is mounted on a housing.

FIG. 1 is a front view illustrating a vehicle lamp according to an embodiment of the present disclosure. FIG. 2 is a view illustrating a vehicle lamp according to an embodiment of the present disclosure. FIG. 2 illustrates a state in which an outer lens is removed from FIG. 1. FIG. 3 is a perspective view illustrating a part of a vehicle lamp according to an embodiment of the present disclosure. FIG. 3 illustrates a state in which a first optical module and a second optical module are mounted on a bezel. FIG. 4 is a perspective view of the vehicle lamp of FIG. 3 viewed from the rear. FIG. 5 is a perspective view illustrating a part of a vehicle lamp according to an embodiment of the present disclosure. FIG. 5 illustrates a state in which a first optical module is mounted on a housing.

Figure 6:
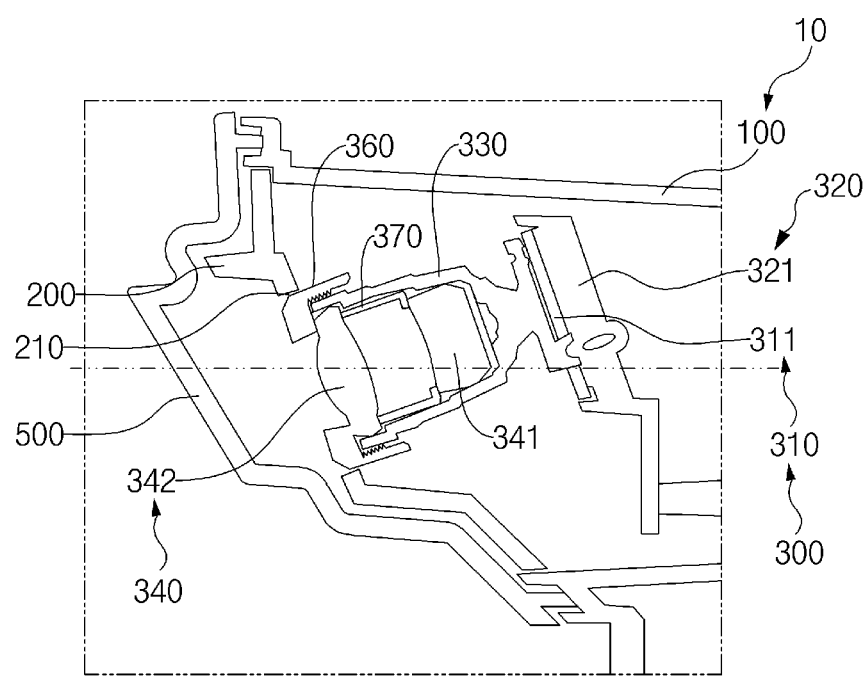
FIG. 6 is a cross-sectional view illustrating a vehicle lamp according to an embodiment of the present disclosure and taken along line B-B of FIG. 5.
Figure 7:
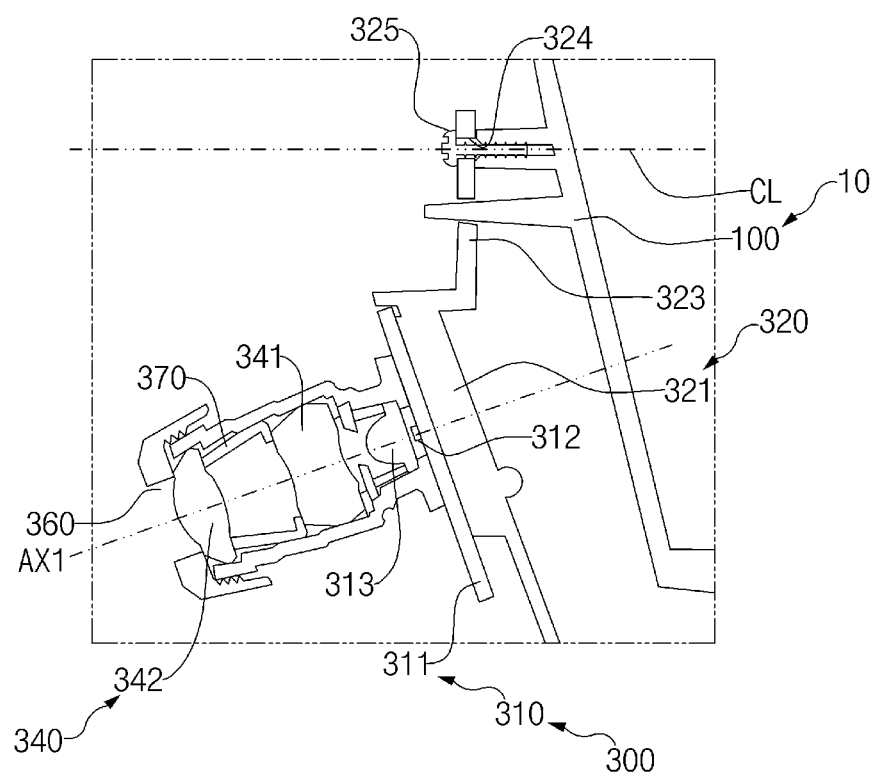
FIG. 7 is a cross-sectional view illustrating a cross section of a vehicle lamp according to an embodiment of the present disclosure and taken along line A-A of FIG. 4.
Figure 8:
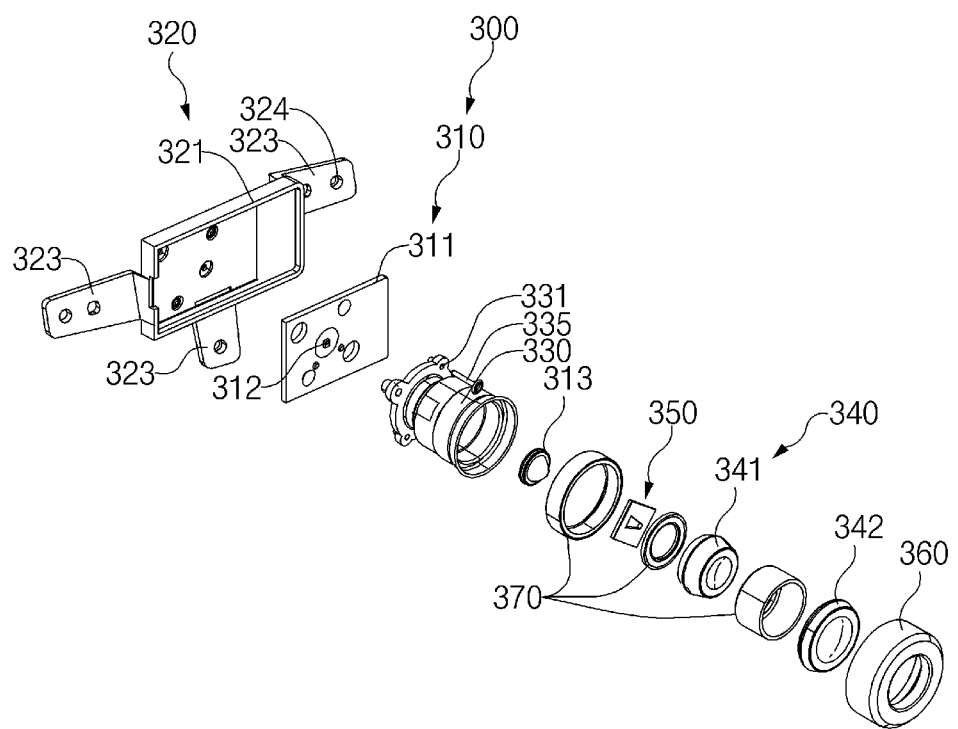
FIG. 8 is an exploded perspective view illustrating a first optical module according to an embodiment of the present disclosure.
Figure 9A:
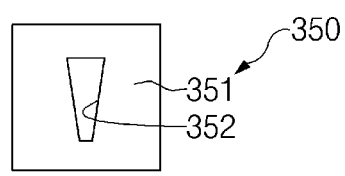
FIGS. 9A to 9C are views illustrating an example of a shield device applied to an embodiment of the present disclosure.
Figure 9B:
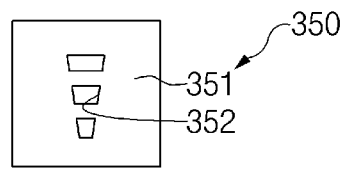
Figure 9C:
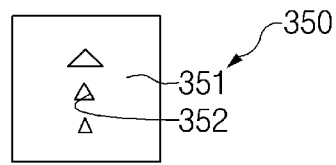

FIG. 6 is a cross-sectional view illustrating a vehicle lamp according to an embodiment of the present disclosure and taken along line B-B of FIG. 5. FIG. 7 is a cross-sectional view illustrating a cross section of a vehicle lamp according to an embodiment of the present disclosure and taken along line A-A of FIG. 4. FIG. 8 is an exploded perspective view illustrating a first optical module according to an embodiment of the present disclosure. FIGS. 9A to 9C are views illustrating an example of a shield device applied to an embodiment of the present disclosure.

For example, a vehicle lamp 10 according to an embodiment of the present disclosure may be a guide lamp that projects light to a road surface adjacent to a vehicle to form a pattern image having a specified shape on the road surface. For example, the vehicle lamp 10 according to the present disclosure may be a reverse guide lamp that is turned on together with a reverse lamp. Hereinafter, a case in which the vehicle lamp 10 according to an embodiment of the present disclosure is a reverse guide lamp will be described as an example. However, the vehicle lamp 10 according to the present disclosure is not limited to the reverse guide lamp, and various lamps for irradiating a specific pattern on a road surface may be applied.

Referring to FIGS. 1 to 9C, the vehicle lamp 10 according to an embodiment of the present disclosure includes a housing 100, a bezel 200, a first optical module 300, and a second optical module 400.

The housing 100 is formed with a space that is opened in a forward direction in which light is irradiated. For example, the housing 100 and the space may extend in a direction parallel to the ground, and components constituting the vehicle lamp 10 may be contained in the space.

In this case, the forward direction, which is the direction in which the light is irradiated, may refer to the direction in which light is irradiated from the vehicle lamp 10. The forward direction may be different from the front and rear based on a traveling direction CL of the vehicle, and the direction indicated by the forward direction may vary depending on the installation position or installation direction of the vehicle lamp 10.

The bezel 200 is mounted on the front of the housing 100, and a first through hole 210 and a second through hole 220 are formed. Specifically, the bezel 200 may be coupled to cover the space of the housing 100, and the first through hole 210 and the second through hole 220 may be formed to be spaced apart from each other in a direction parallel to the ground. The positions and shapes of the first through hole 210 and the second through hole 220 may be formed to correspond to the positions and shapes of the first optical module 300 and the second optical module 400.

The first optical module 300 includes a first light source device 310 provided to irradiate light to a road surface through the first through hole 210. The first optical module 300 is contained in the space and is mounted on the housing 100 to be inclined such that an optical axis AX1 of the first light source device 310 is gradually inclined downward toward the front.

Specifically, the first optical module 300 may be contained in the space of the housing 100, coupled to the housing 100, and installed through the bezel 200 through the first through hole 210. The light generated by the first light source device 310 may be irradiated through the first through hole 210.

In this case, the first optical module 300 may be formed to be inclined downward toward the front such that the light generated by the first light source device 310 is irradiated toward a road surface. That is, because the first optical module 300 is installed to be inclined, the optical axis AX1 of the first light source device 310 may be formed to be gradually inclined downward toward the front. The first optical module 300 may form a specified pattern image on a road surface when turned on, thereby providing information about the traveling direction of the vehicle to surrounding vehicles or pedestrians.

The second optical module 400 includes a second light source device 410 provided to irradiate light forward through the second through hole 220, is contained in the space, and is mounted on the bezel 200.

Specifically, the second optical module 400 may be contained in the space of the housing 100 and coupled to the bezel 200. The light generated by the second light source device 410 may be irradiated forward through the second through hole 220.

More specifically, the second optical module 400 may further include a reflection device 430. The reflection device 430 may be installed on the bezel 200, provided to reflect the light irradiated from the second light source device 410 to irradiate the light forward, and include multi facet reflection (MFR) including a plurality of facets.

The second optical module 400 may irradiate the light generated by the second light source device 410 at various angles by applying the MFR. Accordingly, it is possible to increase the irradiation range of the light of the vehicle lamp 10, thereby confirming the signal in a wider direction around. That is, the visibility of the vehicle lamp 10 may be improved.

As described above, the vehicle lamp 10 according to an embodiment of the present disclosure may be formed in a combination of the first optical module 300 in the type of an imaging optical system, and the second optical module 400 including MFR, thereby improving visibility and safety.

Meanwhile, the embodiment of the present disclosure may further include an outer lens 500. The outer lens 500 may be coupled to the front of the housing 100, and provided to cover the bezel 200, the first optical module 300 and the second optical module 400. The outer lens 500 may be formed to correspond to the shapes of the housing 100 and the bezel 200.

Meanwhile, referring to the embodiments shown in FIGS. 3, 4 and 6, the area in the bezel 200 in which the first optical module 300 is positioned is formed to gradually protrude forward toward the top.

That is, as described above, because the first optical module 300 is gradually inclined downward toward the front, the bezel 200 may be also inclined with respect to the ground to correspond to the angle of the front part of the first optical module 300. Accordingly, the area through which the first optical module 300 passes, that is, the area in which the first through hole 210 is formed in the bezel 200 may be formed to gradually protrude forward toward the top.

For example, the second optical module 400 may be installed in an area including the center of the bezel 200, and the first optical module 300 may be arranged to be biased toward one side of the second optical module 400 in the horizontal direction. For example, the second optical module 400 may be formed to extend along the extension direction of the bezel 200, and the first optical module 300 may be positioned to be spaced apart from one side of the second optical module 400 in the extension direction. For example, the first optical module 300 may be located outside the second optical module 400, that is, on an outboard side of the vehicle, but the embodiment is not limited thereto.

In addition, an area 201 of the bezel 200 in which the first optical module 300 is located may be provided to protrude forward compared to other areas of the bezel 200.

In detail, because the area of the bezel 200 in which the first optical module 300 is located is biased toward one side from the center, one edge area of the bezel 200 may be formed to protrude compared to other portions. As a result, the light emitting area by the first optical module 300 in the bezel 200 may be increased, thereby increasing the appearance marketability of the vehicle lamp 10. In particular, when the first optical module 300 is located at the outermost side of the outboard side of the bezel 200, the appearance marketability may be further increased.

In addition, referring to FIG. 6, the outer lens 500 may be formed to gradually protrude forward toward the upper side in the area where the first optical module 300 is located to correspond to the shape of the bezel 200. However, the shape of the outer lens 500 is not limited thereto.

Meanwhile, the first optical module 300 may further include the first light source device 310, a heat dissipation device 320, a fixing member 325, a barrel device 330 and a lens device 340, and a shield device 350.

The first light source device 310 may include a first substrate 311, a first light source 312, and a collimator 313. In this case, the first substrate 311 may be a printed circuit board (PCB), and the first light source 312 may be a light emitting diode (hereinafter, referred to as an LED). In addition, the collimator 313 may be provided in front of the first light source 312 to convert the light emitted from the first light source 312 into light parallel to the optical axis AX1 to be incident on the lens device 340. However, the configuration of the first light source device 310 is not limited thereto.

The heat dissipation device 320 may be provided to dissipate heat from the first light source device 310. The heat dissipation device 320 may be provided adjacent to or in contact with the first light source device 310 to dissipate heat generated by the first light source device 310. In this case, as long as the heat dissipation device 320 is capable of dissipating the heat generated by the first light source device 310, various types of heat dissipation devices may be applied. For example, when the heat dissipation device 320 contacts the first light source device 310, the heat generated from the first light source device 310 may be transferred to the heat dissipation device 320 by conduction.

The fixing member 325 may be fastened through the heat dissipation device 320 and the housing 100 so as to mount the first optical module 300 to the housing 100. In this case, the fixing member 325 may be fastened to the housing 100 in a direction parallel to the traveling direction CL of the vehicle.

For example, the fixing member 325 may be a bolt member, and may be screwed to the heat dissipation device 320 and the housing 100. In this case, in the fastening direction of the fixing member 325, the fixing member 325 may not be inserted in an inclined direction corresponding to the mounting angle of the first optical module 300, but may be fastened in a direction parallel to the traveling direction CL of the vehicle.

As described above, because the fixing member 325 is fastened parallel to the traveling direction CL of the vehicle regardless of the inclination angle of the first optical module 300, interference with other components installed in the vehicle may be minimized, and the height of the vehicle lamp 10 may be minimized.

The heat dissipation device 320 may include a heat sink 321 and a coupling piece 323.

The heat sink 321 may be coupled to the first light source device 310. For example, the heat sink 321 may be coupled to the first light source device 310 and the barrel device 330 by an assembly member 335 to be described below.

The coupling piece 323 may protrude from the heat sink 321 and be coupled to the housing 100. The coupling piece 323 may be formed with a coupling hole 324 through which the fixing member 325 passes and may be provided in plurality. In addition, the housing 100 may include a fixing groove into which the fixing member 325 is inserted.

For example, as shown in FIG. 8, the coupling piece 323 may extend from the side and the lower portion of the heat sink 321 and may be provided in three pieces. In addition, one or a plurality of coupling holes 324 may be formed in each coupling piece 323. In addition, a fixing groove may be formed in the housing 100 at a position corresponding to the coupling hole 324. However, the numbers and positions of the coupling pieces 323, the coupling holes 324 and the fixing grooves are not limited to the illustrated embodiment.

In this case, the coupling hole 324 and the fixing groove may be formed parallel to the traveling direction CL of the vehicle. Accordingly, when the fixing member 325 is coupled to the coupling hole 324 and the fixing groove, the fixing member 325 may be coupled in a direction parallel to the traveling direction CL of the vehicle. For example, when the fixing member 325 is mounted in an inclined direction, the height of the vehicle lamp 10 may increase as much as the inclined height of the fixing member 325. Therefore, when the fixing member 325 is mounted horizontally as in the present disclosure, the height of the vehicle lamp 10 may be minimized.

The barrel device 330 may be assembled to the front surface of the first light source device 310. In addition, the assembly member 335 may pass through the heat dissipation device 320, the first light source device 310 and the barrel device 330 to assemble the heat dissipation device 320, the first light source device 310 and the barrel device 330.

Specifically, the barrel device 330 may have a hollow formed therein, and a barrel assembly hole 331 through which the assembly member 335 passes may be formed on the side facing the first substrate 311. In addition, the heat dissipation device 320 may be formed at a position corresponding to the barrel assembly hole 331 and may include a heat dissipation assembly hole through which the assembly member 335 passes.

In this case, when the surface extending in the direction perpendicular to the central axis of the barrel device 330 is referred to as a vertical reference surface RF, in a state in which the first optical module 300 is mounted on the housing 100, the assembly member 335 may be spaced apart from the vertical reference surface RF.

More specifically, the heat dissipation assembly hole and the barrel assembly hole 331 may be provided to be spaced apart from the vertical reference surface RF while the first optical module 300 is mounted on the housing 100. For example, in a state in which the first optical module 300 is mounted on the housing 100, a plurality of assembly members 335 may be provided, and the plurality of assembly members 335 may be arranged in a left and right direction from the vertical reference surface RF to be spaced apart from each other.

As described above, the assembly member 335 is not placed on the vertical reference surface RF, so that the assembly member 335 is not located at the upper end of the center of the barrel device 330. Because the upper end of the center of the barrel device 330 has the highest height in the barrel device 330, when the assembly member 335 is not located at the upper end of the center of the barrel device 330, it is possible to prevent the height of the vehicle lamp 10 from being increased by the assembly member 335. Accordingly, the height of the vehicle lamp 10 may be minimized.

Meanwhile, the lens device 340 may be arranged on the emission side of the first light source device 310 and the shield device 350, and may be provided to project the light emitted from the first light source device 310. The lens device 340 may include a first lens 341 and a second lens 342 that are provided to be spaced apart from each other in the optical axis direction.

The first optical module 300 may further include a retainer 370 provided in the barrel device 330. The retainer 370 may serve to fix the first lens 341 and the second lens 342 in the barrel device 330 and maintain a distance from other components.

Meanwhile, the shield device 350 may be arranged between the first light source device 310 and the lens device 340, and may shield a portion of the light irradiated from the first light source device 310 to form a specified beam pattern.

In detail, the shield device 350 may include a shielding area 351 for shielding the light irradiated from the first light source device 310 and a penetration area 352 for passing the light irradiated from the first light source device 310 and forming a specified pattern.

The shield device 350 may be detachably assembled to the barrel device 330. Because the shield device 350 is detachably assembled to the barrel device 330, the shield device 350 may be replaced with the shield device 350 having a different shape when necessary.

For example, the shield device 350 may be formed with the penetration area 352 having various shapes as in the embodiment shown in FIGS. 9A, 9B and 9C. The pattern image formed on a road surface may vary according to the shape of the shield device 350. The shield device 350 may be detachably assembled to the barrel device 330 to be replaceable, and the user may replace the shield device 350 with the shield device 350 which can form a desired pattern image. Accordingly, product satisfaction may be improved.

Meanwhile, the first optical module 300 may further include a head device 360 assembled to the front end of the barrel device 330 to fix the lens device 340 to the barrel device 330.

Meanwhile, referring to the embodiment shown in FIGS. 5 and 8, the heat dissipation device 320 may include the heat sink 321 coupled to the first light source device 310, and the plurality of coupling pieces 323 that protrudes from the heat sink 321 and is coupled to the housing 100.

The upper edge of the heat sink 321 may be formed parallel to a road surface.

For example, when viewed from the optical axis AX1 direction of the first optical module 300, the shape of the heat sink 321 may be formed in a quadrangular shape including an upper side, a lower side and a pair of sides. In addition, the upper side end forming the upper edge may be formed parallel to a line HL parallel to the road surface.

As described above, because the upper edge of the heat sink 321 is formed parallel to the road surface, the height of the vehicle lamp 10 may be minimized. Specifically, because the first optical module 300 is formed to be gradually inclined downward toward the front, the shape of the upper end of the heat sink 321 arranged at the end facing the rear of the first optical module 300 may exert an effect on the height of the vehicle lamp 10. According to the embodiment of the present disclosure, the upper end of the heat sink 321 may be formed to be flat in a state in which the vehicle lamp 10 is mounted on the vehicle, so that it is possible to minimize the overall height of the vehicle lamp 10.

Meanwhile, the second optical module 400 may include the second light source device 410 and the reflection device 430.

The second light source device 410 may include a second substrate 411 provided over the reflection device 430 and a plurality of second light sources 412 installed on the second substrate 411. For example, the second light source 412 may be a light emitting diode (hereinafter, referred to as an LED). An LED drive module, which is an electric circuit for applying a constant current to the second substrate 411 to light the LED, may be printed on the second substrate 411. However, the configuration of the second light source device 410 is not limited thereto.

The reflection device 430 may include a main body 431 and a reflection surface 433.

The main body 431 may be coupled to the second substrate 411 and include a light source hole 432 penetrating at positions corresponding to the plurality of second light sources 412.

The reflection surface 433 may be provided integrally with the main body 431, include a plurality of facets, be continuously formed to correspond to the plurality of second light sources 412, and may be provided in plurality. Accordingly, the plurality of reflection surfaces 433 may have a multi facet reflection (MFR) structure.

In detail, the main body 431 may serve as a frame structure for installing the plurality of reflection surfaces 433. For example, the main body 431 and the reflection surface 433 may be integrally formed, and the main body 431 may extend from a side end and an upper end of the edge of the reflection surface 433. The main body 431 may be coupled to the second substrate 411 provided on the reflection device 430. In addition, the main body 431 may include a coupling hole (not shown) for being coupled to the bezel 200.

The plurality of light source holes 432 may be formed in a portion of the main body 431 extending from the upper end of the reflection surface 433. Each light source hole 432 may be formed at a position corresponding to each of the second light sources 412. The light emitted from the second light source 412 may pass through the light source hole 432 and be irradiated toward the reflection surface 433. The light reaching the reflection surface 433 may be reflected and pass through the second through hole 220, thereby being irradiated forward. In this case, the light irradiation range by the second optical module 400 may be widened by the plurality of reflection surfaces 433 including the plurality of facets.

As described above, according to the vehicle lamp of an embodiment, because the area where the first optical module is located protrudes from the bezel, the light emission area of the second optical module may be increased, thereby increasing the appearance marketability of the vehicle lamp.

In addition, the height of the vehicle lamp may be minimized while mounted on the vehicle.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle lamp comprising:
a housing having a space that is open in a forward direction in which light is irradiated;
a bezel mounted on a front of the housing and having a first through hole and a second through hole;
a first optical module comprising a first light source device provided to irradiate light to a road surface through the first through hole, the first optical module being contained in the space, mounted in the housing, and installed to be inclined to allow an optical axis of the first light source device to be gradually inclined downward in the forward direction;
a second optical module comprising a second light source device provided to irradiate light forward through the second through hole, the second optical module being contained in the space and mounted on the bezel,
wherein an area in which the first optical module is positioned in the bezel is formed to gradually protrude upward in the forward direction; and
an outer lens coupled to the front of the housing and provided to cover the bezel, the first optical module and the second optical module.

2. A vehicle lamp comprising:
a housing having a space that is open in a forward direction in which light is irradiated;
a bezel mounted on a front of the housing and having a first through hole and a second through hole;
a first optical module comprising a first light source device provided to irradiate light to a road surface through the first through hole, the first optical module being contained in the space, mounted in the housing, and installed to be inclined to allow an optical axis of the first light source device to be gradually inclined downward in the forward direction; and
a second optical module comprising a second light source device provided to irradiate light forward through the second through hole, the second optical module being contained in the space and mounted on the bezel,
wherein an area in which the first optical module is positioned in the bezel is formed to gradually protrude upward in the forward direction, and
wherein the second optical module is installed in an area comprising a center of the bezel,
the first optical module is arranged on one side of the second optical module in a horizontal direction, and
an area of the bezel in which the first optical module is located protrudes forward in comparison to other areas of the bezel.

3. A vehicle lamp comprising:
a housing having a space that is open in a forward direction in which light is irradiated;
a bezel mounted on a front of the housing and having a first through hole and a second through hole;
a first optical module comprising a first light source device provided to irradiate light to a road surface through the first through hole, the first optical module being contained in the space, mounted in the housing, and installed to be inclined to allow an optical axis of the first light source device to be gradually inclined downward in the forward direction; and a second optical module comprising a second light source device provided to irradiate light forward through the second through hole, the second optical module being contained in the space and mounted on the bezel, wherein an area in which the first optical module is positioned in the bezel is formed to gradually protrude upward in the forward direction, wherein the first optical module comprises:

a heat dissipation device assembled on a rear surface of the first light source device and adapted to dissipate heat from the first light source device;

a barrel device formed with a receiving space therein and assembled to a front surface of the first light source device; and an assembly member passing through the heat dissipation device, the first light source device and the barrel device, wherein, when a surface extending in a vertical direction from a central axis of the barrel device is a vertical reference surface, the assembly member is spaced apart from the vertical reference surface when the first optical module is mounted on the housing.

4. The vehicle lamp of claim 3, wherein the heat dissipation device comprises a heat dissipation assembly hole through which the assembly member passes, the barrel device comprises a barrel assembly hole through which the assembly member passes, and the heat dissipation assembly hole and the barrel assembly hole are spaced apart from the vertical reference surface while the first optical module is mounted on the housing.

5. The vehicle lamp of claim 3, wherein the heat dissipation device comprises:

a heat sink coupled to the first light source device; and a plurality of coupling pieces protruding from the heat sink and provided to be coupled to the housing, wherein a top edge of the heat sink is parallel to the road surface.

6. The vehicle lamp of claim 5, wherein the heat sink has a quadrangular shape comprising an upper side, a lower side, and a pair of side sides when viewed in an optical axis direction of the first optical module, and the upper side forming the top edge is parallel to the road surface.

7. The vehicle lamp of claim 3, wherein the first optical module further comprises a fixing member fastened through the heat dissipation device and the housing to mount the first optical module to the housing, and the fixing member is fastened to the housing in a direction parallel to a traveling direction of a vehicle.

8. The vehicle lamp of claim 7, wherein the heat dissipation device comprises:

a heat sink coupled to the first light source device; and a plurality of coupling pieces protruding from the heat sink, coupled to the housing, and formed with a coupling hole through which the fixing member passes, wherein the housing comprises a fixing groove into which the fixing member is inserted, and the coupling hole and the fixing groove are parallel to the traveling direction of the vehicle.

9. The vehicle lamp of claim 3, wherein the first optical module further comprises:

a lens device provided in the receiving space formed in the barrel device and arranged in front of the first light source device; and a shield device arranged between the first light source device and the lens device and provided to form a specified beam pattern by shielding a portion of light irradiated from the first light source device.

10. The vehicle lamp of claim 9, wherein the shield device comprises:

a shielding area configured to shield the light irradiated from the first light source device; and a penetration area through which the light emitted from the first light source device passes and is formed in a specified pattern, wherein the shield device is detachably assembled to the barrel device.

11. A vehicle lamp comprising:

a housing having a space that is open in a forward direction in which light is irradiated;

a bezel mounted on a front of the housing and having a first through hole and a second through hole;

a first optical module comprising a first light source device provided to irradiate light to a road surface through the first through hole, the first optical module being contained in the space, mounted in the housing, and installed to be inclined to allow an optical axis of the first light source device to be gradually inclined downward in the forward direction; and a second optical module comprising a second light source device provided to irradiate light forward through the second through hole, the second optical module being contained in the space and mounted on the bezel, wherein an area in which the first optical module is positioned in the bezel is formed to gradually protrude upward in the forward direction, and wherein the second optical module comprises a reflection device installed on the bezel, provided to reflect light emitted from the second light source device to irradiate the light forward, and comprises a multi-facet reflection (MFR) comprising a plurality of facets.

12. The vehicle lamp of claim 11, wherein the second light source device comprises a second substrate provided over the reflection device and a plurality of second light sources installed on the second substrate, and the reflection device comprises:

a main body coupled to the second substrate and comprising a light source hole penetrating at positions corresponding to the plurality of second light sources; and a plurality of reflection surfaces provided integrally with the body, comprising the plurality of facets, and continuously formed to correspond to the plurality of second light sources.

* * * * *